United States Patent
Barakat et al.

(10) Patent No.: US 10,404,962 B2
(45) Date of Patent: Sep. 3, 2019

(54) DRIFT CORRECTION FOR CAMERA TRACKING

(71) Applicant: Intel Corporation, Santa Clara, CA (US)

(72) Inventors: Samer S. Barakat, Santa Clara, CA (US); Mohamed Selim Ben Himane, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 778 days.

(21) Appl. No.: 14/863,614

(22) Filed: Sep. 24, 2015

(65) Prior Publication Data

US 2017/0094245 A1    Mar. 30, 2017

(51) Int. Cl.
| | |
|---|---|
| H04N 13/00 | (2018.01) |
| H04N 13/128 | (2018.01) |
| H04N 13/204 | (2018.01) |
| H04N 13/271 | (2018.01) |
| G01S 3/00 | (2006.01) |
| H04N 5/232 | (2006.01) |

(52) U.S. Cl.
CPC ............ *H04N 13/128* (2018.05); *G01S 3/00* (2013.01); *H04N 5/232* (2013.01); *H04N 13/204* (2018.05); *H04N 13/271* (2018.05); *H04N 2013/0081* (2013.01)

(58) Field of Classification Search
CPC .. H04N 13/128; H04N 13/204; H04N 13/271; H04N 2013/0081
See application file for complete search history.

(56) References Cited

U.S. PATENT DOCUMENTS

| | | |
|---|---|---|
| 2007/0122001 A1 | 5/2007 | Wang et al. |
| 2009/0033655 A1 | 2/2009 | Boca et al. |
| 2013/0063558 A1* | 3/2013 | Phipps ................. H04N 5/2224 348/43 |

(Continued)

OTHER PUBLICATIONS

International Preliminary Report on Patentability received for PCT Application No. PCT/US2016/042450, dated Apr. 5, 2018. 12 pages.

(Continued)

*Primary Examiner* — Eric L Bolda
(74) *Attorney, Agent, or Firm* — Finch & Maloney PLLC

(57) ABSTRACT

Techniques are disclosed for drift correction for camera tracking. In some cases, the techniques include iterative optimization of the camera poses at selected keyframes captured along the camera trajectory to reduce pose errors. Such iterative optimization may include performing an alignment process using the point cloud of a given keyframe and a point cloud made from one or more overlapping keyframes, such as via an iterative closest point (ICP)-based expectation maximization. The keyframes may then be fused to reconstruct a more accurate model of the scene, discarding the existing model. The new model can then be used for tracking and meshing. In some instances, keyframes may be selected such that the overlap with other keyframes includes enough shape features to allow for alignment with the keyframe depth point cloud. In some cases, the techniques can be performed in a particular order giving precedence to keyframes having smaller pose errors.

25 Claims, 5 Drawing Sheets

(56) References Cited

U.S. PATENT DOCUMENTS

| | | | | |
|---|---|---|---|---|
| 2013/0278727 | A1* | 10/2013 | Tamir | H04N 13/261 |
| | | | | 348/47 |
| 2014/0105486 | A1 | 4/2014 | Tamaazousti et al. | |
| 2014/0139639 | A1* | 5/2014 | Wagner | G06T 17/00 |
| | | | | 348/46 |
| 2014/0241617 | A1 | 8/2014 | Shotton et al. | |
| 2015/0084951 | A1* | 3/2015 | Boivin | H04N 5/272 |
| | | | | 345/419 |
| 2015/0350618 | A1* | 12/2015 | Meier | H04N 9/3185 |
| | | | | 345/7 |

OTHER PUBLICATIONS

Newcombe, Richard A., et al., "KinectFusion: Real-Time Dense Surface Mapping and Tracking," retrieved from the Internet at URL: http://homes.cs.washington.edu/~newcombe/papers/newcombe_etal_ismar2011.pdf on Apr. 27, 2016, 10 pages.

Fioraio, Nicola, et al., "Realtime Visual and Point Cloud SLAM," retrieved from the Internet at URL: http://www.velodynelidar.com/lidar/hdlpressroom/pdf/papers/journal_papers/Realtime%20Visual%20and%20Point%20Cloud%20SLAM.pdf, Apr. 2016, 3 pages.

Triggs, Bill, et al., "Bundle Adjustment—A Modern Synthesis," Vision Algorithms: Theory and Practice, vol. 1883 of the series Lecture Notes in Computer Science. Apr. 12, 2002. pp. 298-372.

Whelan, Thomas, et al., "Deformation-based Loop Closure for Large Scale Dense RGB-D SLAM," IEEE/RJS International Conference on Intelligent Robots and Systems. Nov. 3-7, 2013. 8 pages.

International Search Report and Written Opinion received for PCT Application—PCT/US2016/042450, dated Oct. 27, 2016. 15 pages.

Endres, et al., An Evaluation of the RGB-D SLAM System, 2012 IEEE International Conference on Robotics and Automation. May 14-18, 2012. pp. 1691-1696.

* cited by examiner

DRIFT CORRECTION FOR CAMERA TRACKING

BACKGROUND

Camera tracking or match moving is a cinematic technique that allows the insertion of computer graphics into live-action footage with correct position, scale, orientation, and motion relative to the photographed objects in the shot. For example, tracking an RGB-D camera and constructing the surrounding scene using the camera pose and the mapped space (e.g., in the form of 3D polygonal meshes) can allow a user to create software applications for augmented reality, robotics, gaming, and reconstruction. A common issue observed when tracking with RGB-D data (or depth data in general) is drift. Drift in the tracked camera pose can occur due to noisy data, incomplete depth, and the limited frame rate of the camera being used, for example. Small errors in the tracked pose can accumulate into larger ones over a sequence of frames, causing error propagation. Such errors can lead to inaccurate poses and a deformed model of the scene trying to be captured, which consequently causes incorrect behavior by dependent applications. Further, camera drift can lead to significant inconsistencies in the reconstruction of the scene at the meeting ends of a loop, which is commonly referred to as a loop closure problem.

DETAILED DESCRIPTION

Figure 1:
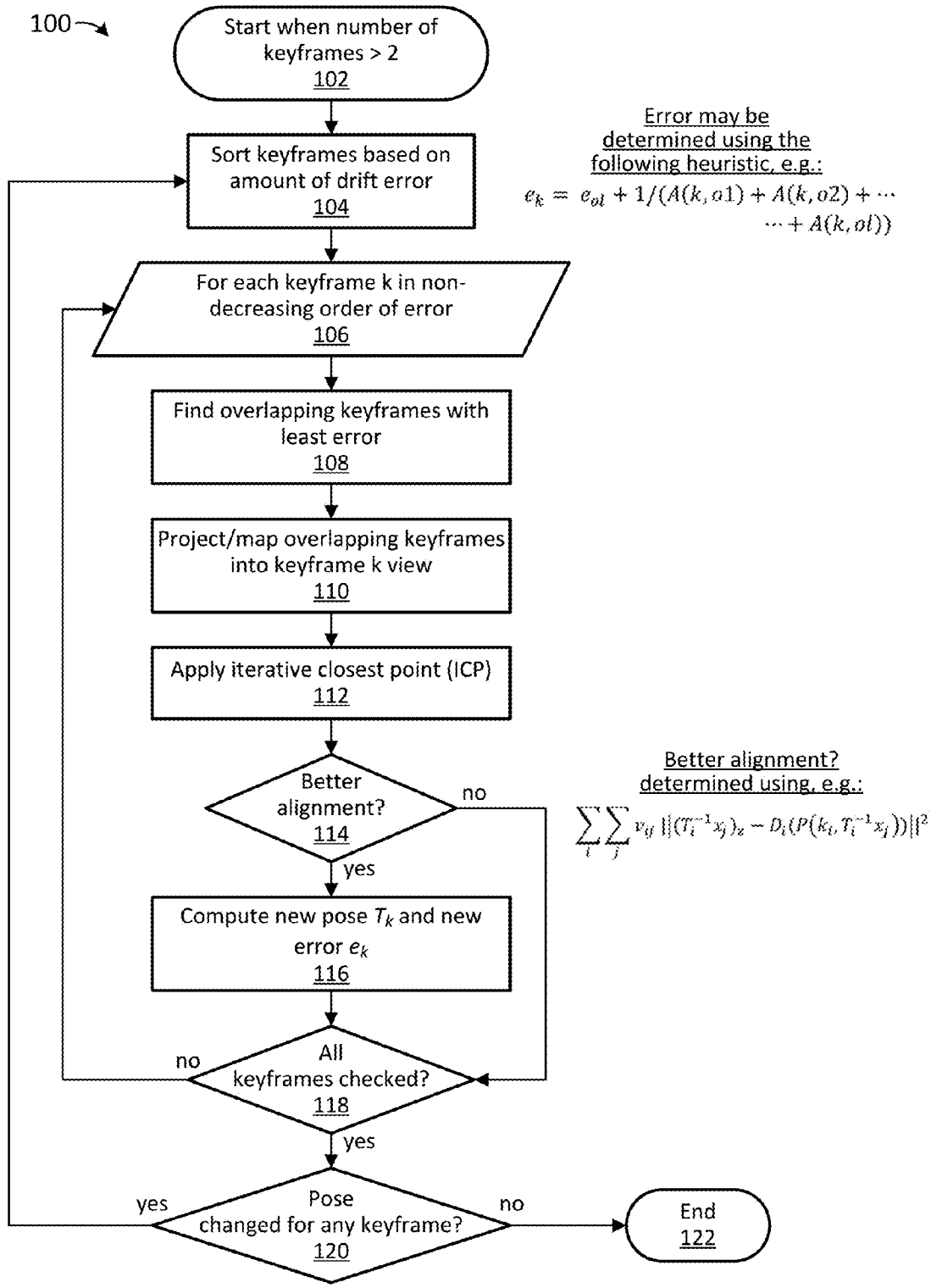
FIG. 1 illustrates a flow diagram of an example method of drift correction for camera tracking, in accordance with an embodiment of the present disclosure.

Techniques are disclosed for drift correction for camera tracking. Drift may occur in a tracked camera pose due to noisy data, incomplete depth, or the limited frame rate of the camera, for example. In some cases, the techniques include iterative optimization of the camera poses at selected keyframes captured along the camera trajectory to reduce pose errors. Such iterative optimization may include performing an alignment process using the point cloud of a given keyframe and a point cloud made from one or more overlapping keyframes, such as via an iterative closest point (ICP)-based expectation maximization. Keyframes generally refer to a small subset of all image frames captured by the camera. An image frame may be selected as a keyframe every time the image frame has a new threshold amount of data (e.g., at least 5, 10, 20, 30, 40, or 50% new data) relative to other keyframes. In most cases, the first image frame will be selected as a keyframe and then other image frames can be analyzed in real time to check whether the threshold of new data has been met. The keyframes may then be fused to reconstruct a more accurate model of the scene, discarding the existing model. The new model can then be used for tracking and meshing. In some instances, keyframes may be selected to have limited depth overlap with all previous keyframes. However, in some such instances, the overlap of any keyframe with other keyframes should have enough shape features to allow for alignment, e.g., via ICP registration with the keyframe depth point cloud. In some cases, the techniques can be performed in a particular order giving precedence to keyframes having smaller pose errors. Numerous variations and configurations will be apparent in light of this disclosure.

General Overview

As previously described, during camera tracking, drift in the tracked camera pose can cause non-trivial issues. Fusion of depth frames to reconstruct a 3D space uses both the image and the camera pose. If there is error in the camera pose, the fusion will have error and thus the reconstruction will have error. Drift in the tracked camera pose introduces such error. Attempts to address camera drift and loop closure problems have been made, using, for example, bundle adjustment techniques. Bundle adjustment is a process that attempts to iteratively minimize the re-projection error between image locations of observed and predicted points in a scene. However, bundle adjustment requires significant memory and computation resources to retain and solve the system of equations necessary for the pose optimization used by the process. Further, bundle adjustment is typically dependent on finding a well-captured small set of visual features creating rigid pairwise constraints in a global optimization process. Further still, bundle adjustment is typically performed as an offline post-processing phase and is thus not suitable for real-time drift correction.

Thus, and in accordance with one or more embodiments of the present disclosure, techniques are disclosed for drift correction for camera tracking. In some embodiments, the techniques include the iterative optimization of the camera poses at selected keyframes captured along the camera trajectory. A new keyframe may be added every time a new frame being captured has a threshold amount of scene data that was not in any previously captured keyframe (e.g., at least 10% new data). In some embodiments, the iterative optimization may include performing an alignment process using the point cloud of a given keyframe and a point cloud made from one or more overlapping keyframes, such as via an iterative closest point (ICP)-based expectation maximization. In some such embodiments, the ICP techniques may be used to register point clouds, finding the transformation that best aligns the corresponding points. For example, depth fusion tracking can use ICP to identify the 3D transformation that maps a point cloud from a particular frame to the following one to thereby achieve camera tracking. After the new frame's pose is computed, the point cloud may be fused to a 3D grid representation of the world in the form of a weighted and truncated distance field. Moving from one frame to the next, the pose estimation may get contaminated with small numerical errors. The errors may be integrated in the distance field during the fusion process, thereby affecting the tracking process, causing a growing drift. When keyframes are identified, their corresponding poses are similarly affected by this drift (except for the first keyframe, which has a known pose). Accordingly, the drift correction techniques variously described herein can be used to reduce, minimize, or eliminate camera drift and the issues associated with such drift, using a pose adjustment process that minimizes error caused by the drift.

In some embodiments, each keyframe may be selected to have limited depth and overlap with all previous keyframes, while still including enough overlap with other keyframes (e.g., including a sufficient amount of overlap of shape features) to allow for ICP registration with the keyframe depth point cloud. The keyframes, after potential pose adjustment is performed as variously described herein, can be fused to reconstruct a more accurate model of the scene, discarding the existing model. The new, more accurate model of the scene can then be used for tracking and meshing for all captured frames. In some embodiments, the techniques can use an iterative approach, where at each iteration, ICP is used to re-determine every keyframe pose. In some such embodiments, re-determining every keyframe pose can lead to decreasing pose errors if performed in an order that gives precedence to keyframes having smaller pose errors, for example. In some embodiments, the techniques include an order for the keyframe pose adjustment process. In some such embodiments, the order is based on errors caused by drift as well as a heuristic metric to quantify those errors. In some embodiments, when a point is matched to multiple points from different overlapping frames, only the match from the keyframe of least error is used for the linear system computation. Such a method can be compared to other methods that create constraints for each match and thereby disadvantageously make the final solution a compromise. In some embodiments, the drift correction techniques variously described herein may be used in mobile computing devices, such as smartphones, tablet computing devices, etc. that include depth sensing cameras, such as one or more stereo cameras, time-of-flight cameras, or any other camera technology that can provide depth (e.g., point cloud) information.

The techniques for drift correction variously described herein can provide numerous benefits. In some embodiments, the techniques can be performed without the costly and non-parallelizable (or minimally-parallelizable) computations used for bundle adjustment processes. For example, the techniques provide benefits over bundle adjustment processes, as the techniques variously described in the present disclosure attempt to solve for the alignment of a keyframe with its entire area of overlap with other keyframes. This provides benefits over bundle adjustment processes, because such processes depend on finding a well-captured set of specific visual features, thereby requiring identification of the specific visual features and also limiting the overlap process. Accordingly, the techniques described herein are more robust to noisy data, as more data is used in the overlap analysis. In other words, using alignment techniques (e.g., ICP) between a point cloud from a particular keyframe and the combined point clouds for a subset of overlapping keyframes for the re-estimation of the keyframe pose is advantageous over methods that use pairwise keyframe registration to identify rigid pairwise constraints in a global optimization process. Further, the use of iterative graph-based keyframe pose adjustment in the techniques to find poses of maximum likelihood given all of the point cloud data observable from various other keyframes provides benefits over, for example, attempting to maximize the likelihood of poses based on only pre-identified visual features (e.g., as used during bundle adjustment). In some embodiments, tracking data may be incrementally updated based on new pose estimation data from the drift correction techniques and the depth data associated with the keyframes. In addition, the drift correction techniques variously described herein can be performed in real-time or on-the-fly, with each new keyframe added, which is beneficial over other drift correction methods that perform the correction after all keyframes are collected. In some embodiments, the techniques can improve the user experience and make augmented reality more seamless. Numerous benefits will be apparent in light of the present disclosure.

As will be apparent in light of the present disclosure, the drift correction techniques, as variously described herein, can be detected in any suitable way. In some embodiments, use of the techniques may be detected by analyzing the camera pose trajectory when tracking a scene with no color features but sufficient shape features. In some embodiments, use of the techniques may be detected by determining that drift correction and/or updating the tracking distance field is occurring real-time or on-the-fly. In some embodiments, use of the techniques may be detected by identifying that the combined point clouds for a subset of overlapping keyframes are being used for re-estimation of keyframe poses, as compared to, for example, pairwise keyframe registration that identifies rigid pairwise constraints in a global optimization. In some embodiments, use of the techniques may be detected based on ordering keyframe poses based on the errors caused by the drift and/or using a heuristic to quantify such errors. Numerous ways of detecting the drift correction techniques as variously described herein will be apparent in light of the present disclosure.

Example Drift Correction Techniques

FIG. 1 illustrates a flow diagram of an example method 100 of drift correction for camera tracking, in accordance with an embodiment of the present disclosure. In this example embodiment, drift correction method 100 includes expectation maximization by iteratively readjusting the camera pose for each keyframe based on a sufficient subset of keyframes with least drift errors. In some such embodiments, sufficient can mean that the subset has enough overlap with the keyframe in consideration for the alignment techniques being used (e.g., ICP-based expectation maximization) can provide a correct registration pose. The process can then be repeated on all keyframes until there are no or negligible changes to the poses. In some embodiments, in every iteration, the keyframes can be traversed for re-adjustment in non-decreasing order of pose drift errors. Otherwise, in such embodiments, large pose drift errors can propagate to other keyframes making the process difficult (or unable) to converge. Starting with keyframes with smaller errors can help correct for pose errors in other overlapping keyframes. In some embodiments, method 100 may be performed every time a new keyframe is added or every time a new loop is discovered, for example, thereby allowing the method to be performed in real time. In some embodiments, method 100 may be performed as a post-process to the scene scanning phase to correct for the deformed model. For example, reconstruction applications may perform method 100 as a post-process, depending on the particular application.

Method 100, in this example embodiment, starts 102 when the number of keyframes is greater than 2. As method 100 is being used for camera tracking, it can be understood that frames (e.g., electronically coded still images in video technology) are being captured at a frame rate, such as at a rate in the range of 24 to 60 frames per second, for example. The video or frames being captured in this example embodiment are from an RGB-D camera, such as a stereo camera or a time-of-flight camera, having a field of view and capable of providing both depth and color information for the field of view. However, any suitable image sensor(s) or camera(s) capable of providing depth information can be used to provide such frames, as will be apparent in light of the present disclosure. Keyframes are a small subset from the total number of frames captured. In this example embodiment, the first frame is used as the first keyframe. The identification of additional keyframes can be performed using any suitable techniques. For example, as previously described, a new keyframe may be added every time a frame being captured has a threshold amount of data that was not in any previously captured keyframe. In some embodiments, the threshold amount of data for adding a keyframe may be when at least 5, 10, 20, 30, 40, or 50 percent of a captured frame has new data relative to previously captured keyframes. In some embodiments, the threshold amount of data may be hard coded, user-configurable, or some combination thereof (e.g., it has a default value but can be changed by a user). Although, in this example embodiment, method 100 starts 102 when the number of keyframes is greater than 2, other embodiments may begin after more than 1, 3, 4, 5, 6, 7, 8, 9, 10, or any other suitable number of keyframes are identified.

In some embodiments, the issue of drift can be corrected for a given set k of n keyframes, where each keyframe is associated with a pose $T_i$, $1 \le i \le n$, a depth image $D_i$ and a color image $C_i$, by finding (or otherwise determining) the keyframe poses $T^*_i$ that minimize the error defined in Equation 1 below:

$$\Sigma_i \Sigma_j v_{ij} \| (T_i^{-1} x_j)_z - D_i(P(k_i, T_i^{-1} x_j)) \|^2 \quad (1)$$

where $v_{ij}$ indicates if point $x_j$ is visible in keyframe i, $(q)_z$ the component of a point q, $P(k_i, x_i)$ is the projection of that point to the keyframe, and $D_i$ is the depth value at the projection point. This minimization can apply to all point cloud data generated from the depth and pose information associated with every keyframe. Therefore, the minimization attempts to reduce the discrepancy between a point's computed depth from its generating keyframe and the depth values found when it is projected to other keyframes. In other words, this can be seen as finding the keyframe poses that maximizes the likelihood a particular point is observed in the same 3D position from different keyframes. The minimization will be discussed in more detail below, with respect to method 100.

Continuing with FIG. 1, method 100 includes sorting 104 the keyframes based on error. In some instances, the drift errors for different keyframes may be measurable or at least relatively ordered. For example, a separate camera may be used in combination with the camera used for tracking, where the separate camera is measuring the movement of the camera used for tracking in attempts of measuring drift error. However, in some instances, that may not be the case. Therefore, in some embodiments, a heuristic reflecting the drift errors at different keyframes can be used to sort 104 the keyframes. In the example heuristic provided below in Equation 1, smaller errors imply a higher priority for a keyframe to be used to correct for another keyframe's pose. As the first keyframe is known to suffer no errors, it is assigned the highest priority with an error $e_o=0$ where $e_i$ refers to the heuristic error function for keyframe i. A keyframe with the largest overlap with this first keyframe, represented by keyframe k, is least likely to suffer large drift errors. Thus, the heuristic error function for keyframe k can be represented by $e_k=1/A(k, 0)$ where $A(k, 0)$ is the area of overlap. As can be understood based on the present disclosure, a large overlap can enhance the chance for more shape features to be visible from both keyframes, making the ICP registration process more reliable. In some embodiments, other criteria, such as condition number for the registration linear system can be alternatively be used.

Continuing with determining heuristic error for the sorting process 104, a keyframe k may overlap with keyframes o1, o2, ..., om, where $e_{o1} \le e_{o2} \le e_{o3} \ldots \le e_{om}$ and m is the total number of keyframes overlapping with keyframe k. Note that the identified order of the keyframes and the amount of error may or may not correlate. For example, if a user is performing tracking and the field of view of the camera returns to a field of view near the first keyframe (e.g., to close the loop), then a keyframe generated with that field of view may have the second least error, but may be the thirtieth keyframe generated, for example. Continuing with determining heuristic error, if there is a subset of size $l \le m$ containing enough shape features visible from keyframe k then, in some embodiments, just that sufficient subset with least errors can be used for the pose adjustment. In some such embodiments, such as when $l<m$, use of the smaller subset of size l may prevent unnecessary errors from the remainder of set m from affecting the registration process. Further, in some such embodiments, the lower bound on the error for keyframe k may be $e_{ol}$, and in some cases, may also include an additional factor reflecting the size of the overlap with these keyframes, such that if another keyframe overlaps with the same subset but with a smaller area, such a consideration could be incorporated in the heuristic. Equation 2 below is provided as an example heuristic value for error:

$$e_k = e_{ol} + 1/(A(k,o1) + A(k,o2) + \ldots + A(k,ol)) \quad (2)$$

Note that Equation 2 is provided for illustrative purposes only and is not intended to limit the present disclosure. Accordingly, other suitable heuristics may be used to assist with sorting 104 keyframes, depending on the end use or target application.

Method 100 continues by performing three processes for each keyframe k in non-decreasing order of error 106. Recall, the error for a given keyframe, $e_k$, can be determined, for example, using the heuristic provided in Equation 2, or any other suitable heuristic. The processes include finding 108 overlapping keyframes with least error for the given keyframe, projecting or mapping 110 overlapping keyframes into the view of the given keyframe, and applying 112 iterative closes point (ICP) techniques. Finding 108 overlapping keyframes with least error for the given keyframe may include finding overlapping keyframes m and then sorting those keyframes o1, o2, ..., om, based on the amount of error in those keyframes $e_{o1} \le e_{o2} \le e_{o3} \le \ldots \le e_{om}$. However, recall that in some embodiments, overlapping keyframe subset l may be used instead of all keyframes m, to prevent unnecessary errors from the remainder of set m from affecting the registration process, for example. In other words, the keyframes in subset l may be one or more keyframes from all overlapping keyframes m having the least amounts of error, such that one or more overlapping keyframes m having the most amount of error are ignored in processes 108, 110, and 112.

In this example embodiment, projecting or mapping 110 overlapping keyframes can be performed using any suitable techniques, as will be apparent in light of the present disclosure. Applying 112 ICP includes aligning the given keyframe to the existing model created by projection/mapping 110, using the depth information and known camera pose from the given keyframe as well as the depth information and camera pose information for the existing model, to determine 114 whether there is better alignment after having applied 112 ICP. Although ICP-based techniques are primarily used herein in the example method 100, any suitable alignment processes may be utilized, depending on the end use or target application. As previously described, the ICP process is applied 112 on the point cloud for a particular keyframe k with the combined point clouds from keyframes o1, o2, . . . , ol. In some embodiments, the combined set can be found, for example, by accumulating the data from the individual keyframes into a 3D grid of the truncated distance field followed by raycasting the 3D grid from the pose of keyframe k. In some embodiments, an alternative technique for finding the combined set includes projecting/mapping the point clouds to the view frame of keyframe k. In some such embodiments, efficiency may be gained in terms of memory and computation needs by using the alternative technique.

Continuing with method 100, determination 114 of whether there is better alignment can be performed using, for example, Equation 1 provided above, or any other suitable technique, depending on the end use or target application. If it is determined at 114 that the ICP does provide a better alignment, method 100 continues by computing 116 new pose $T_k$ and new error $e_k$. Computation 116 of the new pose $T_k$ may be performed using any suitable technique, such as using the old pose information for the specific keyframe combined with the information obtained from applying 112 ICP (e.g., based on the alignment of the specific keyframe in the existing model generated using overlapping keyframes with least error) to compute/update the camera pose for the keyframe. Computation 116 of the new error $e_k$ can be performed using the heuristic provided above in Equation 2, or any other suitable heuristic, as will be apparent in light of the present disclosure.

After computations 116 have been performed or, from 114, if it is determined that there isn't better alignment as a result of applying 112 ICP, the method continues with determining 118 if all keyframes have been checked. If at determination 118 all keyframes have not been checked, the method returns to 106 to perform processes 108-118 for the next keyframe in non-decreasing order of error. If at determination 118, all keyframes have been checked, the method continues to determine 120 if the pose has changed for any keyframe. If the pose has changed for any keyframe at 120, the method returns to 104 to sort the keyframes based on heuristic error. In this manner, drift correction method 100 iteratively readjusts the pose for each keyframe until there are no or negligible changes to the poses. In every iteration, the keyframes are re-adjusted in non-decreasing order of pose drift errors to, for example, prevent large pose drift errors from propagating to other keyframes (which may make the process difficult or unable to converge). If at determination 120 the pose has not changed for any keyframe, the method may end 122. In some embodiments, the end 122 of method 100 may return to start 102 when a new keyframe is added. In some embodiments, the end 122 of method 100 may return to start 102 when a new loop is discovered. For example, if it is determined that a new keyframe overlaps with the first keyframe, for instance, method 100 may be applied to all keyframes as a result of the loop having been closed (e.g., a user tracks a single room by spinning in place 360 degrees to close the tracking loop and return back to at least a portion of the field of view of the first keyframe). Numerous variations and configurations on drift correction method 100 will be apparent in light of the present disclosure.

Figure 2:
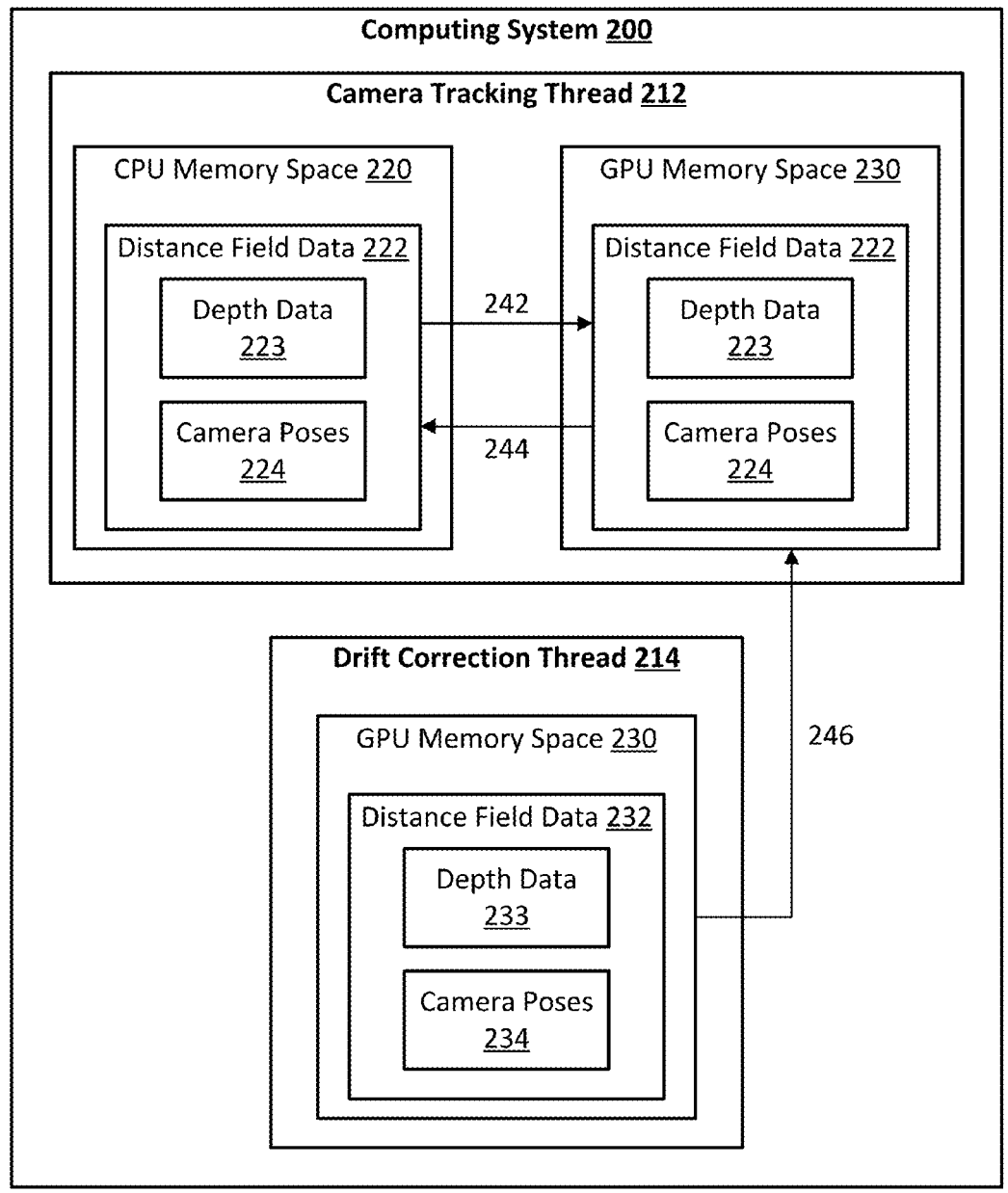
FIG. 2 illustrates example drift correction techniques performed using a computing system, in accordance with an embodiment of the present disclosure.

FIG. 2 illustrates example drift correction techniques performed using computing system 200, in accordance with an embodiment of the present disclosure. In this example embodiment, computing system 200 includes a central processing unit (CPU) including related memory space 220 and a graphics processing unit (GPU) including related memory space 230. Memory spaces 220 and 230 may be implemented as any combination of memory 412 and/or storage 414 described below with reference to FIG. 4. In this example embodiment, the camera tracking thread 212 is shown being run on both CPU memory space 220 and GPU memory space 230, while the drift correction thread 214 is shown being run on GPU memory space 230. In this manner, the threads 212 and 214 can be run in parallel for real time drift correction, for example. As can also be seen in FIG. 2, the tracking threads include their own distance field data 222 (in camera tracking thread 212) and 232 (in drift correction thread 214, where distance field data 222 includes depth data 223 and camera poses 224, and distance field data 232 includes depth data 233 and camera poses 234. As can be understood, drift correction thread 214 can be used to perform the drift correction techniques as variously described herein. In this example embodiment, an ICP process can be run in both the GPU memory space 230 of the camera tracking thread 212 and the GPU memory space of the drift correction thread 214. Further, in this example embodiment, the tracking thread manages both CPU and GPU portions of the space and the streaming process between the CPU and GPU. For example, data can be streamed 242 from the CPU memory space 220 to the GPU memory space 230, and data can be streamed 244 from the GPU memory space 230 to the CPU memory space 220.

In some instances, such as for large scenes, only a portion of the distance field may fit on GPU memory space 230. For example, the volume resident on GPU space 230 may be defined through a bounding box and as the camera moves in 3D space, the bounding box may also move, allowing for different portions of the distance field to be moved between CPU 220 and GPU 230. In some such instances, relevant portions of the distance field to be used for tracking can be streamed from CPU memory space 220 to GPU memory space 230. When the tracking thread is about to stream data 242 from CPU space 220 to GPU space 230, the camera tracking thread 212 also checks if the drift correction thread 214 can provide more accurate data via 246 from the model it has built. If it can, the camera tracking thread 212 will discard its CPU saved data and use this corrected data instead. Accordingly, after new keyframe poses are computed, the 3D truncated distance field used for tracking can be cleared and re-built from the adjusted keyframe poses and depth data. For example, after the drift correction techniques have been performed on thread 214, it may be possible to update only the relevant portions of the distance field residing on GPU space 230 by fusing the depth data from the intersecting keyframes. In some such cases, tracking thread 212 may be halted momentarily for a short update cycle. In addition, in some cases, when distance field data is to be streamed 242 from CPU space 220 to GPU space 230, the data can be computed by accumulating the depth images of the keyframes that intersect with the relevant portions of the 3D space. Such a process can amortize the update cost of the distance field over the course of the tracking. Moreover, such a process can prevent updates that are unlikely to affect the tracking quality until the next optimization cycle.

Figure 3A:
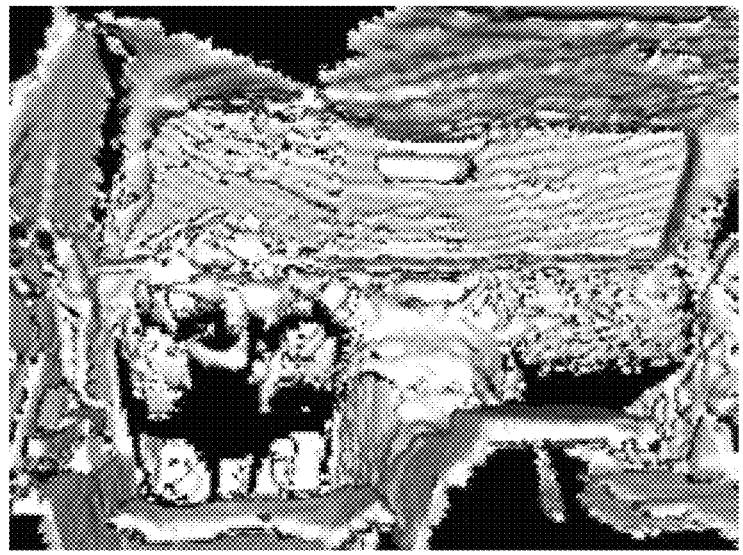
FIGS. 3A-B are images of 3D reconstructed models of a vehicle interior from camera poses with errors and from camera poses using the drift correction techniques, respectively, in accordance with an embodiment of the present disclosure.
Figure 3B:
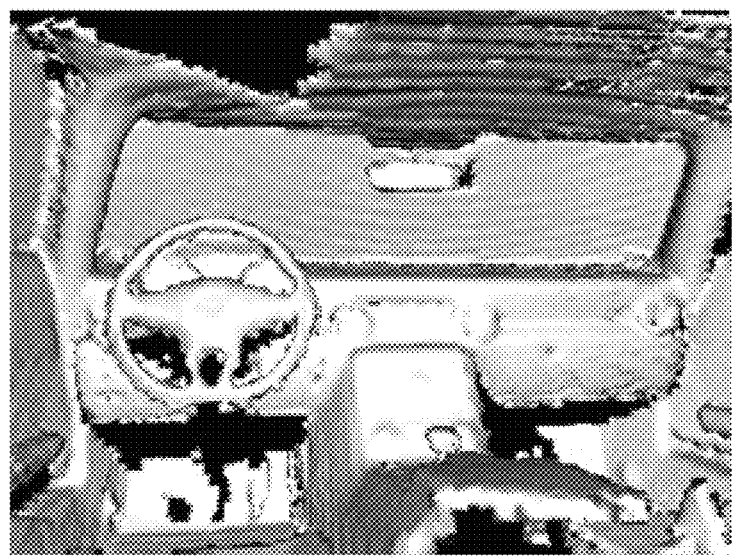

FIGS. 3A-B are images of 3D reconstructed models of a vehicle interior from camera poses with errors and from camera poses using the drift correction techniques, respectively, in accordance with an embodiment of the present disclosure. In both FIGS. 3A-B, the camera poses of nine keyframes were synthetically perturbed to introduce error in the camera poses. The image of FIG. 3A illustrates the 3D reconstructed model with no correction for the errors. The image of FIG. 3B illustrates the 3D reconstructed model with expectation maximization correction applied to the keyframe poses using the drift correction techniques variously described herein. As can be seen, the drift correction performed during the 3D model reconstruction of the vehicle interior results in a significantly more accurate representation of the vehicle interior in FIG. 3B, compared to the 3D model of FIG. 3A.

Example System

Figure 4:
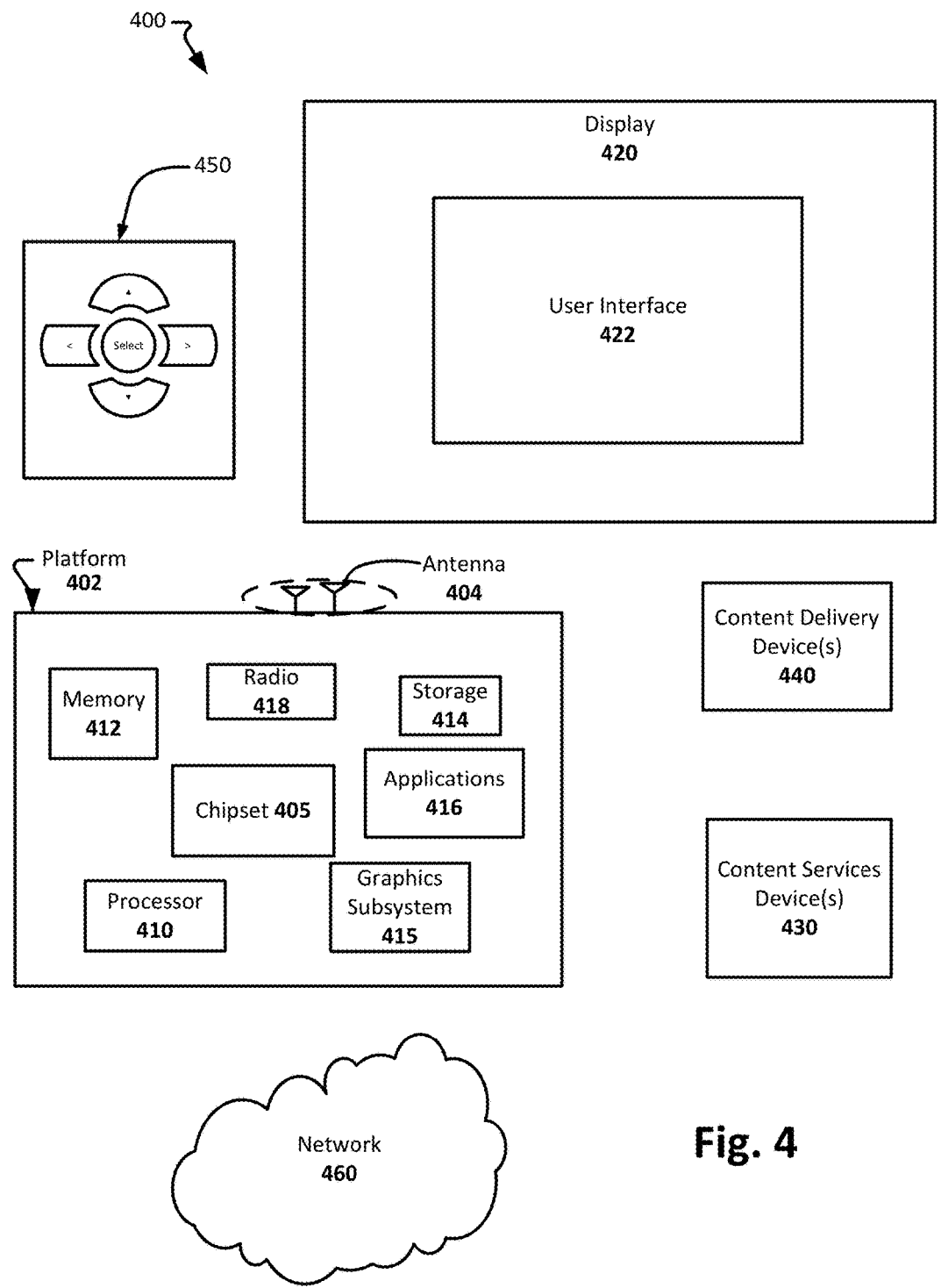
FIG. 4 illustrates a media system configured in accordance with an embodiment of the present disclosure.

FIG. 4 illustrates an example system 400 that may carry out the drift correction techniques, in accordance with an embodiment. In some embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), wearable computer (e.g., computing watch or computing glasses), mobile internet device (MID), messaging device, data communication device, set-top box, game console, or other such computing environments capable of performing graphics rendering operations.

In some embodiments, system 400 includes a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these example components is described in more detail below.

In some embodiments, platform 402 includes any combination of a chipset 405, processor 410, memory 412, storage 414, graphics subsystem 415, applications 416 and/or radio 418. Chipset 405 provides intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 410 includes dual-core processor(s), dual-core mobile processor(s), quad-core processor(s), and so forth. Memory 412 may be implemented, for instance, as a volatile memory device such as, but not limited to, a Random Access Memory (RAM), Dynamic Random Access Memory (DRAM), or Static RAM (SRAM). Storage 414 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 414 includes technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 can be integrated into processor 410 or chipset 405. Graphics subsystem 415 can be a stand-alone card communicatively coupled to chipset 405. The graphics and/or video processing techniques described herein may be implemented in various hardware architectures. For example, hardware assisted privilege access violation check functionality as provided herein may be integrated within a graphics and/or video chipset. Alternatively, a discrete security processor may be used. In still another embodiment, the graphics and/or video functions including hardware assist for privilege access violation checks may be implemented by a general purpose processor, including a multi-core processor.

Radio 418 can include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In some embodiments, display 420 includes any television or computer type monitor or display. Display 420 may comprise, for example, a liquid crystal display (LCD) screen, electrophoretic display (EPD or liquid paper display, flat panel display, touch screen display, television-like device, and/or a television. Display 420 can be digital and/or analog. In some embodiments, display 420 is a holographic or three-dimensional display. Also, display 420 can be a transparent surface that may receive a visual projection. Such projections may convey various forms of information, images, and/or objects. For example, such projections may be a visual overlay for a mobile augmented reality (MAR) application. Under the control of one or more software applications 416, platform 402 can display a user interface 422 on display 420.

In some embodiments, content services device(s) 430 can be hosted by any national, international and/or independent service and thus accessible to platform 402 via the Internet or other network, for example. Content services device(s) 430 can be coupled to platform 402 and/or to display 420. Platform 402 and/or content services device(s) 430 can be coupled to a network 460 to communicate (e.g., send and/or receive) media information to and from network 460. Content delivery device(s) 440 can be coupled to platform 402 and/or to display 420. In some embodiments, content services device(s) 430 includes a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, graphics, text, medical and gaming content, and so forth.

Content services device(s) 430 receives content such as cable television programming including media information, digital information, and/or other content. Examples of content providers may include any cable or satellite television or radio or Internet content providers. The provided examples are not intended to limit the scope of the present disclosure. In some embodiments, platform 402 receives control signals from navigation controller 450 having one or more navigation features. The navigation features of controller 450 may be used to interact with user interface 422, for example. In some embodiments, navigation controller 450 can be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 can be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422. In some embodiments, controller 450 is not a separate component but rather is integrated into platform 402 and/or display 420.

In some embodiments, drivers (not shown) include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may comprise hardware and/or software support for 5.1 surround sound audio and/or high definition 7.1 surround sound audio, for example. Drivers may include a graphics driver for integrated graphics platforms. In some embodiments, the graphics driver includes a peripheral component interconnect (PCI) express graphics card.

In various embodiments, any one or more of the components shown in system 400 can be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the scope of the present disclosure.

In various embodiments, system 400 can be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media include a wire, cable, metal leads, printed circuit board (PCB), backplane, switch fabric, semiconductor material, twisted-pair wire, co-axial cable, fiber optics, and so forth.

Platform 402 can establish one or more logical or physical channels to communicate information. The information may include media information and control information. Media information refers to any data representing content meant for consumption by a user. Examples of content include, for example, data from a voice conversation, videoconference, streaming video, email or text messages, voice mail message, alphanumeric symbols, graphics, image, video, text and so forth. Control information refers to any data representing commands, instructions or control words meant for used by an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 4.

Figure 5:
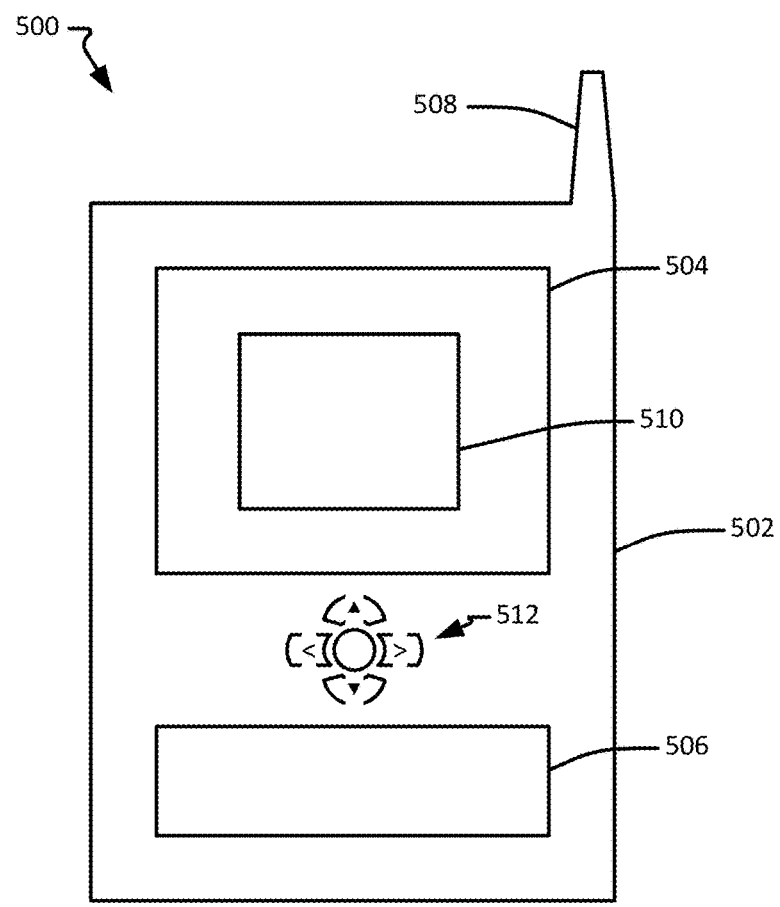
FIG. 5 illustrates a mobile computing device configured in accordance with an embodiment of the present disclosure.

As described above, system 400 may be embodied in varying physical styles or form factors. FIG. 5 illustrates embodiments of a small form factor device 500 in which system 400 may be embodied. In some embodiments, for example, device 500 may be implemented as a mobile computing device having wireless capabilities. A mobile computing device refers to any device having a processing system and a mobile power source or supply, such as one or more batteries, for example.

As previously described, examples of a mobile computing device include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments are described with a mobile computing device implemented as a smart phone, it will be appreciated that other embodiments may be implemented using other wireless mobile computing devices as well.

As shown in FIG. 5, device 500 includes a housing 502, a display 504, an input/output (I/O) device 506, and an antenna 508. Device 500 may, for example, include navigation features 512. Display 504 includes any suitable display unit for displaying information appropriate for a mobile computing device. I/O device 506 includes any suitable I/O device for entering information into a mobile computing device. Examples for I/O device 506 include an alphanumeric keyboard, a numeric keypad, a touch pad, input keys, buttons, switches, rocker switches, microphones, speakers, voice recognition device and software, and so forth. Information may be entered into device 500 by way of one or more microphones of the device, such as to receive the microphone input signals variously described herein (e.g., first/primary microphone input signal, second/secondary microphone input signal, etc.). Such information may be digitized by a voice recognition device.

Various embodiments can be implemented using hardware elements, software elements, or a combination of both. Examples of hardware elements includes processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article or computer program product which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language. Some embodiments may be implemented in a computer program product that incorporates the functionality of the drift correction techniques, as variously disclosed herein, and such a computer program product may include one or more machine-readable mediums or be operated by one or more processors, for example.

Some embodiments of the system of FIG. 4 and the device of FIG. 5 may include one or more image sensors or cameras. In some such embodiments, the image sensors or cameras may be capable of detecting, capturing, and/or generating image depth data. For example, an included camera may be a stereo camera having two more lenses, each with a separate image sensor or film frame, capable of detecting, capturing, and/or generating image depth data, such as RGB-D data for a given image. An included camera may also be a time-of-flight camera or any other camera including the capability to provide depth (e.g., point cloud) information or data. As will be apparent in light of the present disclosure, such depth data can be used for camera tracking or match moving purposes, and further can be used with the camera tracking drift correction techniques variously described herein.

Unless specifically stated otherwise, it will be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays.

Further Example Embodiments

The following examples pertain to further embodiments, from which numerous permutations and configurations will be apparent.

Example 1 is a method for camera tracking drift correction, the method including: obtaining keyframes from a plurality of image frames, wherein each keyframe has a point cloud and a camera pose; mapping one or more overlapping keyframes into the field of view of a given keyframe to create a combined point cloud from the overlapping keyframes; performing an alignment process on the point cloud of the given keyframe and the combined point cloud to determine whether the camera pose of the given keyframe is to be readjusted; and in response to determining the camera pose of the given keyframe is to be readjusted, readjusting the camera pose of the given keyframe to a new camera pose.

Example 2 includes the subject matter of Example 1, wherein obtaining the keyframes includes receiving the keyframes from at least one of a stereo camera and time-of-flight camera.

Example 3 includes the subject matter of any of Examples 1-2, wherein obtaining the keyframes includes determining a new keyframe when at least a predetermined amount of data is visible in an image frame and not visible in any previous keyframes.

Example 4 includes the subject matter of any of Examples 1-3, wherein the alignment process includes an iterative closest point (ICP) process.

Example 5 includes the subject matter of any of Examples 1-4, further including sorting the keyframes based on drift error, wherein the drift error for a given keyframe is determined based on a heuristic for quantifying the drift error.

Example 6 includes the subject matter of Example 5, wherein the mapping, alignment, and readjustment determination processes are repeated for each keyframe in non-decreasing order of drift error until all keyframes have been checked.

Example 7 includes the subject matter of Example 6, wherein the sorting, mapping, alignment, and readjustment determination processes are repeated if the camera pose of any keyframe is readjusted.

Example 8 includes the subject matter of any of Examples 5-7, wherein the heuristic uses the keyframe with the most error from a set of keyframes overlapping with the given keyframe in combination with an area of overlap to quantify the drift error for the given keyframe.

Example 9 includes the subject matter of Example 8, wherein the area of overlap includes the area of overlap of the keyframe with the most drift error and the area of overlap of all keyframes having less error than the keyframe with the most drift error.

Example 10 includes the subject matter of any of Examples 8-9, wherein the set of keyframes overlapping with the given keyframe used in the heuristic is a subset of less or equal keyframes than all overlapping keyframes, and wherein the subset includes keyframes having the least amount of drift error.

Example 11 includes the subject matter of any of Examples 1-10, wherein the determination of whether the camera pose of the given keyframe is to be readjusted is performed by determining whether the alignment process provides a better alignment than using the camera pose of the given keyframe.

Example 12 includes the subject matter of any of Examples 1-11, wherein the method is performed on a graphics processing unit (GPU) of a computing device.

Example 13 includes the subject matter of any of Examples 1-12, further including rebuilding a three-dimensional truncated distance field used for tracking based on the new camera pose of the given keyframe.

Example 14 includes the subject matter of Example 13, wherein the rebuilding is performed in real time.

Example 15 includes the subject matter of any of Examples 13-14, wherein the rebuilding is performed on a graphics processing unit (GPU) of a computing device for only a portion of a space being tracked covered by the keyframes in consideration for correction, and wherein keyframes not relevant to the space being tracked are stored in memory accessible by a central processing unit (CPU) of the computing device, such that data relevant to the space being tracked can be streamed from the CPU to the GPU.

Example 16 is a non-transitory computer program product having instructions encoded thereon that when executed by one or more processors cause a camera tracking drift correction process to be carried out, the process including: obtain keyframes from a plurality of image frames, wherein each keyframe has a point cloud and a camera pose; map one or more overlapping keyframes into the field of view of a given keyframe to create a combined point cloud from the overlapping keyframes; perform an alignment process on the point cloud of the given keyframe and the combined point cloud to determine whether the camera pose of the given keyframe is to be readjusted; and in response to determining the camera pose of the given keyframe is to be readjusted, readjust the camera pose of the given keyframe to a new camera pose.

Example 17 includes the subject matter of Example 16, wherein obtaining the keyframes includes receiving the keyframes from at least one of a stereo camera and a time-of-flight camera.

Example 18 includes the subject matter of any of Examples 16-17, wherein obtaining the keyframes includes determining a new keyframe when at least a predetermined amount of data is visible in an image frame and not visible in any previous keyframes.

Example 19 includes the subject matter of any of Examples 16-18, wherein the alignment process includes an iterative closest point (ICP) process.

Example 20 includes the subject matter of any of Examples 16-19, the process further including: sort the keyframes based on drift error, wherein the drift error for a given keyframe is determined based on a heuristic for quantifying the drift error.

Example 21 includes the subject matter of Example 20, wherein the map, alignment, and readjustment determination processes are repeated for each keyframe in non-decreasing order of drift error until all keyframes have been checked.

Example 22 includes the subject matter of Example 21, wherein the sort, map, alignment, and readjustment determination processes are repeated if the camera pose of any keyframe is readjusted.

Example 23 includes the subject matter of any of Examples 20-22, wherein the heuristic uses the keyframe with the most error from a set of keyframes overlapping with the given keyframe in combination with an area of overlap to quantify the drift error for the given keyframe.

Example 24 includes the subject matter of Example 23, wherein the area of overlap includes the area of overlap of the keyframe with the most drift error and the area of overlap of all keyframes having less error than the keyframe with the most drift error.

Example 25 includes the subject matter of any of Examples 23-24, wherein the set of keyframes overlapping with the given keyframe used in the heuristic is s subset of less or equal keyframes than all overlapping keyframes, and wherein the subset includes keyframes having the least amount of drift error.

Example 26 includes the subject matter of any of Examples 16-25, wherein the determination of whether the camera pose of the given keyframe is to be readjusted is performed by determining whether the alignment process provides a better alignment than using the camera pose of the given keyframe.

Example 27 includes the subject matter of any of Examples 16-26, wherein the camera tracking drift correction process is performed on a graphics processing unit (GPU) of a computing device.

Example 28 includes the subject matter of any of Examples 1-27, the process further including: rebuild a three-dimensional truncated distance field used for tracking based on the new camera pose of the given keyframe.

Example 29 includes the subject matter of Example 28, wherein the rebuild is performed in real time.

Example 30 includes the subject matter of any of Examples 28-29, wherein the rebuild is performed on a graphics processing unit (GPU) of a computing device for only a portion of a space being tracked covered by the keyframes in consideration for correction, and wherein keyframes not relevant to the space being tracked are stored in memory accessible by a central processing unit (CPU) of the computing device, such that data relevant to the space being tracked can be streamed from the CPU to the GPU.

Example 31 is a system for camera tracking drift correction, the system including: at least one of a stereo camera and a time-of-flight camera configured to capture a plurality of image frames having depth data; and a processor configured to: obtain keyframes from the plurality of image frames, wherein each keyframe has a point cloud, and a camera pose; map one or more overlapping keyframes into the field of view of a given keyframe to create a combined point cloud from the overlapping keyframes; perform an alignment process on the point cloud of the given keyframe and the combined point cloud to determine whether the camera pose of the given keyframe is to be readjusted; and in response to determining the camera pose of the given keyframe is to be readjusted, readjust the camera pose of the given keyframe to a new camera pose.

Example 32 includes the subject matter of Example 31, wherein the point cloud of a given keyframe is determined based on the depth data associated with the given keyframe.

Example 33 includes the subject matter of any of Examples 31-32, wherein obtaining the keyframes includes determining a new keyframe when at least a predetermined amount of data is visible in an image frame and not visible in any previous keyframes.

Example 34 includes the subject matter of any of Examples 31-33, wherein the alignment process includes an iterative closes point (ICP) process.

Example 35 includes the subject matter of any of Examples 31-34, the processor further configured to: sort the keyframes based on drift error, wherein the drift error for a given keyframe is determined based on a heuristic for quantifying the drift error.

Example 36 includes the subject matter of Example 35, wherein the map, alignment, and readjustment determination processes are repeated for each keyframe in non-decreasing order of drift error until all keyframes have been checked.

Example 37 includes the subject matter of Example 36, wherein the sort, map, alignment, and readjustment determination processes are repeated if the camera pose of any keyframe is readjusted.

Example 38 includes the subject matter of any of Examples 35-37, wherein the heuristic uses the keyframe with the most error from a set of keyframes overlapping with the given keyframe in combination with an area of overlap to quantify the drift error for the given keyframe.

Example 39 includes the subject matter of Example 38, wherein the area of overlap includes the area of overlap of the keyframe with the most drift error and the area of overlap of all keyframes having less error than the keyframe with the most drift error.

Example 40 includes the subject matter of any of Examples 38-39, wherein the set of keyframes overlapping with the given keyframe used in the heuristic is a subset of less or equal keyframes than all overlapping keyframes, and wherein the subset includes keyframes having the least amount of drift error.

Example 41 includes the subject matter of any of Examples 31-40, wherein the determination of whether the camera pose of the given keyframe is to be readjusted is performed by determining whether the alignment process provides a better alignment than using the camera pose of the given keyframe.

Example 42 includes the subject matter of any of Examples 31-41, wherein the processor is a graphics processing unit (GPU).

Example 43 includes the subject matter of any of Examples 31-42, the processor further configured to: rebuild a three-dimensional truncated distance field used for tracking based on the new camera pose of the given keyframe.

Example 44 includes the subject matter of Example 43, wherein the rebuild is performed in real time.

Example 45 includes the subject matter of any of Examples 43-44, wherein the rebuild is performed on a graphics processing unit (GPU) for only a portion of a space being tracked covered by the keyframes in consideration for correction, and wherein keyframes not relevant to the space being tracked are stored in memory accessibly by a central processing unit (CPU), such that data relevant to the space being tracked can be streamed from the CPU to the GPU.

Example 46 is a mobile computing device including the subject matter of any of Examples 31-45.

The foregoing description of example embodiments has been presented for the purposes of illustration and description. This description is not intended to be exhaustive or to limit the present disclosure to the precise forms disclosed. Many modifications and variations are possible in light of this disclosure. This disclosure does not intend to limit the scope of the various embodiments. Future filed applications claiming priority to this application may claim the disclosed subject matter in a different manner, and may generally include any set of one or more limitations as variously disclosed or otherwise demonstrated herein.

What is claimed is:

1. A method for camera tracking drift correction, the method comprising:
    obtaining keyframes from a plurality of image frames, wherein each keyframe has a field of view, a point cloud, and an estimated camera pose;
    mapping, for a given keyframe, one or more said keyframes overlapping with the given keyframe into the field of view of the given keyframe to create a combined point cloud from the one or more overlapping keyframes;
    performing an alignment process on the point cloud of the given keyframe and the combined point cloud to determine whether to adjust the estimated camera pose of the given keyframe; and
    in response to determining to adjust the estimated camera pose of the given keyframe, adjusting the estimated camera pose of the given keyframe to a new estimated camera pose.

2. The method of claim 1, wherein obtaining the keyframes includes receiving the keyframes from at least one of a stereo camera and a time-of-flight camera.

3. The method of claim 1, wherein obtaining the keyframes includes determining a new keyframe when at least a predetermined amount of data is visible in an image frame and not visible in any previous said keyframes.

4. The method of claim 1, wherein the alignment process includes an iterative closest point (ICP) process.

5. The method of claim 1, further comprising sorting the keyframes based on drift error, wherein the drift error for the given keyframe is determined based on a heuristic for quantifying the drift error using the one or more overlapping keyframes.

6. The method of claim 5, wherein the mapping, alignment, and adjustment determination processes are repeated for each keyframe in non-decreasing order of the drift error until all the keyframes have been checked.

7. The method of claim 6, wherein the sorting, mapping, alignment, and adjustment determination processes are repeated if the estimated camera pose of any keyframe is adjusted.

8. The method of claim 5, wherein the heuristic uses the keyframe with the most drift error from among the one or more overlapping keyframes in combination with an area of overlap to quantify the drift error for the given keyframe.

9. The method of claim 8, wherein the area of overlap includes the area of overlap of the given keyframe with each of the one or more overlapping keyframes.

10. The method of claim 8, wherein the one or more overlapping keyframes is a subset of all said keyframes overlapping with the given keyframe, and wherein the drift error of each of the overlapping keyframes in the subset is less than or equal to the drift error of each of the overlapping keyframes not in the subset.

11. The method of claim 1, wherein determining whether to adjust the estimated camera pose of the given keyframe by includes determining whether the new estimated camera pose provides a better alignment than using the estimated camera pose of the given keyframe.

12. The method of claim 1, wherein the method is performed on a graphics processing unit (GPU) of a computing device.

13. The method of claim 1, further comprising rebuilding a three-dimensional truncated distance field used for tracking based on the new estimated camera pose of the given keyframe.

14. The method of claim 13, wherein the rebuilding is performed in real time.

15. The method of claim 13, wherein the rebuilding is performed on a graphics processing unit (GPU) of a computing device for only a portion of a space covered by the keyframes and that is currently being considered for drift correction, and wherein keyframes not currently being considered for drift correction are stored in memory accessible by a central processing unit (CPU) of the computing device, such that data relevant to the keyframes currently being considered can be streamed from the CPU to the GPU.

16. A non-transitory computer program product having instructions encoded thereon that when executed by one or more processors cause a camera tracking drift correction process to be carried out, the process comprising:
  obtain keyframes from a plurality of image frames, wherein each keyframe has a field of view, a point cloud, and an estimated camera pose;
  map, for a given keyframe, one or more said keyframes overlapping with the given keyframe into the field of view of the given keyframe to create a combined point cloud from the one or more overlapping keyframes;
  perform an alignment process on the point cloud of the given keyframe and the combined point cloud to determine whether to adjust the estimated camera pose of the given keyframe; and
  in response to determining to adjust the estimated camera pose of the given keyframe, adjust the estimated camera pose of the given keyframe to a new estimated camera pose.

17. The computer program product of claim 16, wherein the alignment process includes an iterative closest point (ICP) process.

18. The computer program product of claim 16, the process further comprising: sort the keyframes based on drift error, wherein the drift error for the given keyframe is determined based on a heuristic for quantifying the drift error using the one or more overlapping keyframes.

19. The computer program product of claim 18, wherein the map, alignment, and adjustment determination processes are repeated for each keyframe in non-decreasing order of the drift error until all the keyframes have been checked.

20. The computer program product of claim 19, wherein the sort, map, alignment, and adjustment determination processes are repeated if the estimated camera pose of any keyframe is adjusted.

21. A system for camera tracking drift correction, the system comprising:
  at least one of a stereo camera and a time-of-flight camera configured to capture a plurality of image frames having depth data; and
  a processor configured to:
    obtain keyframes from the plurality of image frames, wherein each keyframe has a field of view, a point cloud, and an estimated camera pose;
    map, for a given keyframe, one or more said keyframes overlapping with the given keyframe into the field of view of the given keyframe to create a combined point cloud from the one or more overlapping keyframes;
    perform an alignment process on the point cloud of the given keyframe and the combined point cloud to determine whether to adjust the estimated camera pose of the given keyframe; and
    in response to determining to adjust the estimated camera pose of the given keyframe, adjust the estimated camera pose of the given keyframe to a new estimated camera pose.

22. The system of claim 21, wherein the alignment process includes an iterative closest point (ICP) process.

23. The system of claim 21, the processor being further configured to: rebuild a three-dimensional truncated distance field used for tracking based on the new estimated camera pose of the given keyframe.

24. The system of claim 23, wherein the processor includes a graphics processing unit (GPU) and a central processing unit (CPU), wherein the rebuilding is performed on the GPU for only a portion of a space covered by the keyframes and that is currently being considered for drift correction, and wherein keyframes not currently being considered for drift correction are stored in memory accessible by the CPU, such that data relevant to the keyframes currently being considered can be streamed from the CPU to the GPU.

25. A mobile computing device comprising the system of claim 21.

* * * * *